(12) United States Patent
Salter et al.

(10) Patent No.: US 12,269,365 B2
(45) Date of Patent: Apr. 8, 2025

(54) SYSTEMS AND METHODS FOR PROVIDING IN-FLIGHT CHARGING OF ELECTRIFIED VEHICLES

(71) Applicant: FORD GLOBAL TECHNOLOGIES, LLC, Dearborn, MI (US)

(72) Inventors: Stuart C. Salter, White Lake, MI (US); James Baumbick, Northville, MI (US); Ryan J. O'Gorman, Beverly Hills, MI (US); Katherine Howard-Cone, Canton, MI (US); Paul Kenneth Dellock, Northville, MI (US); Peter Phung, Windsor (CA); Annette Lynn Huebner, Highland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 946 days.

(21) Appl. No.: 17/175,786

(22) Filed: Feb. 15, 2021

(65) Prior Publication Data
US 2022/0258642 A1 Aug. 18, 2022

(51) Int. Cl.
| | |
|---|---|
| *B60L 53/66* | (2019.01) |
| *B60D 1/14* | (2006.01) |
| *B60D 1/62* | (2006.01) |
| *B60L 53/16* | (2019.01) |
| *B60L 53/18* | (2019.01) |
| *B60L 53/30* | (2019.01) |
| *B60L 53/36* | (2019.01) |

(52) U.S. Cl.
CPC .............. *B60L 53/665* (2019.02); *B60D 1/14* (2013.01); *B60D 1/62* (2013.01); *B60L 53/16* (2019.02); *B60L 53/18* (2019.02); *B60L 53/305* (2019.02); *B60L 53/36* (2019.02)

(58) Field of Classification Search
CPC ...... B60L 53/665; B60L 53/305; B60L 53/36; B60L 53/16; B60L 53/18; B60L 53/57; B60L 53/60; B60D 1/14; B60D 1/62
See application file for complete search history.

(56) References Cited

U.S. PATENT DOCUMENTS

| | | | |
|---|---|---|---|
| 9,407,105 B2 | 8/2016 | Hyde et al. | |
| 10,556,513 B2 | 2/2020 | Kamen et al. | |
| 2007/0216217 A1* | 9/2007 | Clark | B60T 13/74 188/3 R |
| 2014/0088804 A1* | 3/2014 | Hyde | H02J 7/342 701/22 |

(Continued)

FOREIGN PATENT DOCUMENTS

WO 2019/226630 A1 11/2019

*Primary Examiner* — Yufeng Zhang
(74) *Attorney, Agent, or Firm* — David B. Kelley; Carlson, Gaskey & Olds, P.C.

(57) ABSTRACT

This disclosure relates to systems and methods for coordinating and executing in-flight energy transfer events between vehicles. Energy may be transferred from a towing or leading vehicle to a towed or trailing vehicle, from the trailing vehicle to the leading vehicle, or both during the in-flight energy transfer events. The proposed systems may further be configured to coordinate the terms and conditions of a service agreement between the leading and trailing vehicles, coordinate the publication of a service experience rating from a user of the leading and/or trailing vehicle, and/or coordinate the termination of the in-flight charging event by either user.

20 Claims, 10 Drawing Sheets

(56) References Cited

U.S. PATENT DOCUMENTS

2017/0282740 A1\* 10/2017 Ichikawa .............. B60W 20/00
2019/0047427 A1   2/2019 Pogorelik
2020/0070718 A1\* 3/2020 Tani ...................... B60Q 5/006
2020/0282857 A1   9/2020 Mortensen et al.
2020/0324665 A1  10/2020 Mackenzie et al.

\* cited by examiner

SYSTEMS AND METHODS FOR PROVIDING IN-FLIGHT CHARGING OF ELECTRIFIED VEHICLES

TECHNICAL FIELD

This disclosure is directed to systems and methods for coordinating and achieving in-flight vehicle-to-vehicle bidirectional energy transfer.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are typically charged while parked at a charging station or some other utility power source.

SUMMARY

A vehicle-to-vehicle in-flight energy transfer system according to an exemplary aspect of the present disclosure includes, among other things, a leading vehicle, a trailing vehicle, and a control module configured to control a transfer of energy from the trailing vehicle to the leading vehicle in a manner that extends an available towing distance of the leading vehicle during an in-flight energy transfer event.

In a further non-limiting embodiment of the foregoing system, the trailing vehicle is coupled to the leading vehicle by a towing device during the in-flight energy transfer event.

In a further non-limiting embodiment of either of the forgoing systems, a charge cable connects to a first charge port assembly of the leading vehicle and a second charge port assembly of the trailing vehicle during the in-flight energy transfer event.

In a further non-limiting embodiment of any of the foregoing systems, the control module is configured to interface with a bidirectional power transfer system of at least one of the leading vehicle and the trailing vehicle for controlling the transfer of energy from the trailing vehicle to the leading vehicle.

In a further non-limiting embodiment of any of the foregoing systems, the control module is configured to control a transfer of energy from the leading vehicle to the trailing vehicle during the in-flight energy transfer event.

In a further non-limiting embodiment of any of the foregoing systems, the transfer of energy is initiated in response to an input from a user of the leading vehicle or the trailing vehicle.

In a further non-limiting embodiment of any of the foregoing systems, the input is received at a human machine interface or a personal electronic device associated with the leading vehicle or the trailing vehicle.

In a further non-limiting embodiment of any of the foregoing systems, the control module is further configured to determine whether a distance from the trailing vehicle to a charging station exceeds an estimated vehicle range of the trailing vehicle and command transmission of an in-flight charging request from the trailing vehicle to the leading vehicle when the distance exceeds the estimated vehicle range.

In a further non-limiting embodiment of any of the foregoing systems, the control module is further configured to coordinate, through a cloud-based server system, terms and conditions of a service agreement for executing the in-flight charging event between the leading vehicle and the trailing vehicle.

In a further non-limiting embodiment of any of the foregoing systems, the control module is further configured to command an alert system of the leading vehicle or the trailing vehicle to emit audible instructions for guiding the leading vehicle or the trailing vehicle relative to the other of the leading vehicle or the trailing vehicle prior to performing the in-flight energy transfer event.

In a further non-limiting embodiment of any of the foregoing systems, the control module is further configured to receive a termination request from either the leading vehicle or the trailing vehicle, and in response to the termination request, command a bidirectional power transfer system to halt the transfer of energy.

In a further non-limiting embodiment of any of the foregoing systems, a human machine interface or a personal electronic device is associated with the leading vehicle or the trailing vehicle. The human machine interface, the personal electronic device, or both is configured through a cloud-based application to receive an input of an experience rating associated with the in-flight charging event.

A method according to another exemplary aspect of the present disclosure includes, among other things, transferring energy from a trailing vehicle to a leading vehicle to extend an available towing distance of the leading vehicle during an in-flight energy transfer event.

In a further non-limiting embodiment of the foregoing method, the method includes, during the in-flight energy transfer event, transferring energy from the leading vehicle to the trailing vehicle.

In a further non-limiting embodiment of either of the foregoing methods, the method includes, prior to transferring the energy, determining whether a distance from the trailing vehicle to a charging station exceeds an estimated vehicle range of the trailing vehicle, transmitting an in-flight charging request from the trailing vehicle to the leading vehicle when the distance exceeds the estimated vehicle range, comparing a capability of the leading vehicle to one or more preferences contained within the in-flight charging request, preparing a service agreement of terms and conditions that will control the in-flight energy transfer event, and transmitting the service agreement to the trailing vehicle.

In a further non-limiting embodiment of any of the forgoing methods, the method includes accepting the terms and conditions of the service agreement or transmitting a counteroffer to the leading vehicle.

In a further non-limiting embodiment of any of the forgoing methods, the method includes, upon completion of the in-flight energy transfer event, publishing a service experience rating from a user of the leading vehicle, a user of the trailing vehicle, or both.

In a further non-limiting embodiment of any of the forgoing methods, the method includes, prior to transferring the energy, verifying an identify of the leading vehicle or the trailing vehicle via a unique code or pin that is exchanged between the respective vehicles.

In a further non-limiting embodiment of any of the forgoing methods, the method includes, receiving a termination request from either the leading vehicle or the trailing vehicle, and in response to the termination request, commanding a bidirectional power transfer system to halt the transferring of the energy.

A vehicle-to-vehicle in-flight energy transfer system according to another exemplary aspect of the present disclosure includes, among other things, a memory and a processor operably coupled to the memory. The processor is configured to determine when a distance from a first vehicle to a charging station exceeds an estimated vehicle range of the first vehicle, coordinate terms and conditions of a service agreement between the first vehicle and a second vehicle for performing an in-flight charging event when the distance exceeds the estimated vehicle range, coordinate a transfer of energy between the first vehicle and the second vehicle during the in-flight charging event, and coordinate a publication of a service experience rating from a user of the first vehicle, a user of the second vehicle, or both upon completion of the in-flight charging event.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and executing in-flight energy transfer events between vehicles. Energy may be transferred from a towing or leading vehicle to a towed or trailing vehicle, from the trailing vehicle to the leading vehicle, or both during the in-flight energy transfer events. The proposed systems may further be configured to coordinate the terms and conditions of a service agreement between the leading and trailing vehicles, coordinate the publication of a service experience rating from a user of the leading and/or trailing vehicle, and/or coordinate the termination of the in-flight charging event by either user. These and other features of this disclosure are discussed in greater detail in the following paragraphs of this detailed description.

Figure 1:
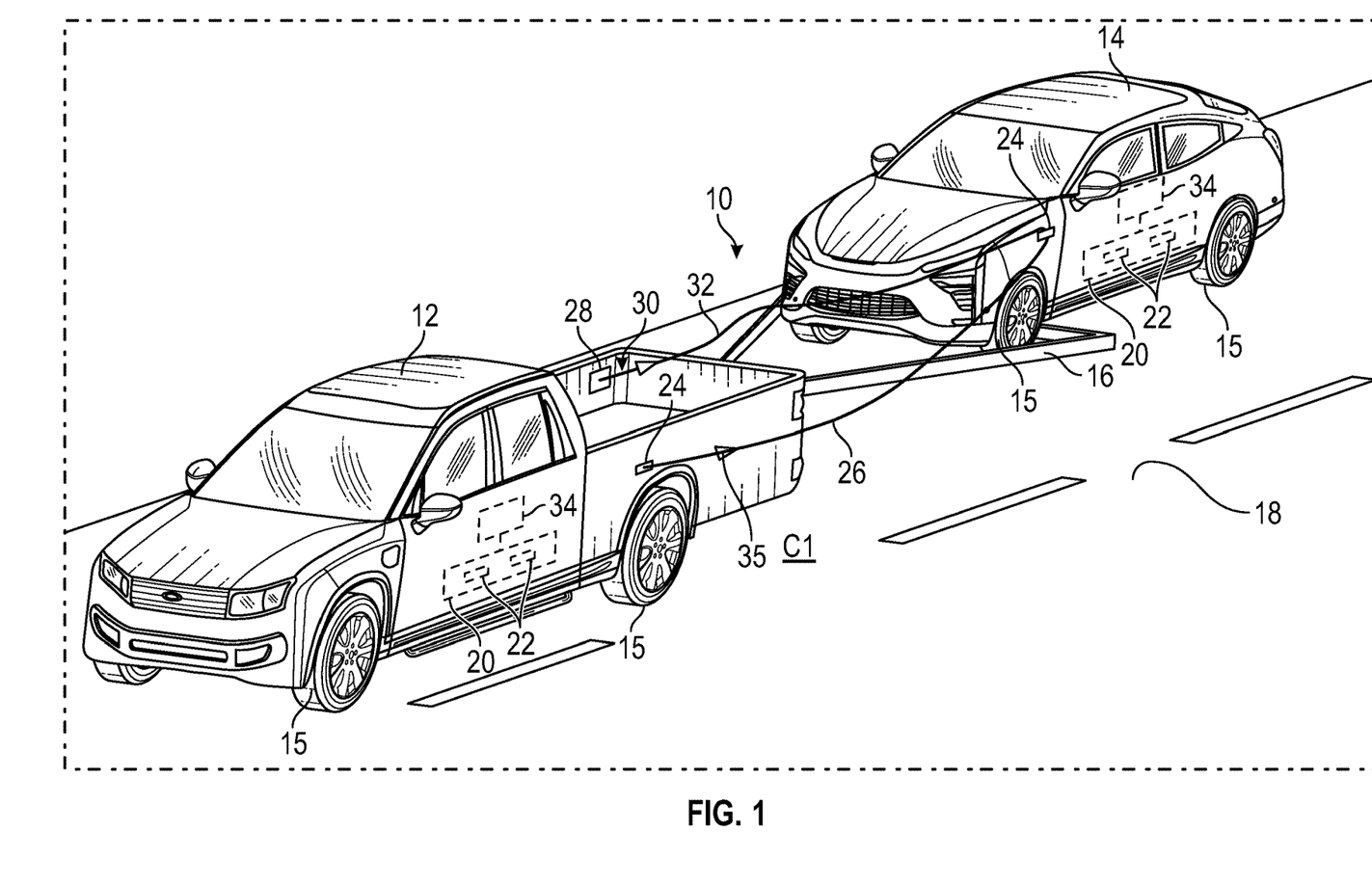
FIG. 1 schematically illustrates a first in-flight configuration of a vehicle-to-vehicle energy transfer system.
Figure 2:
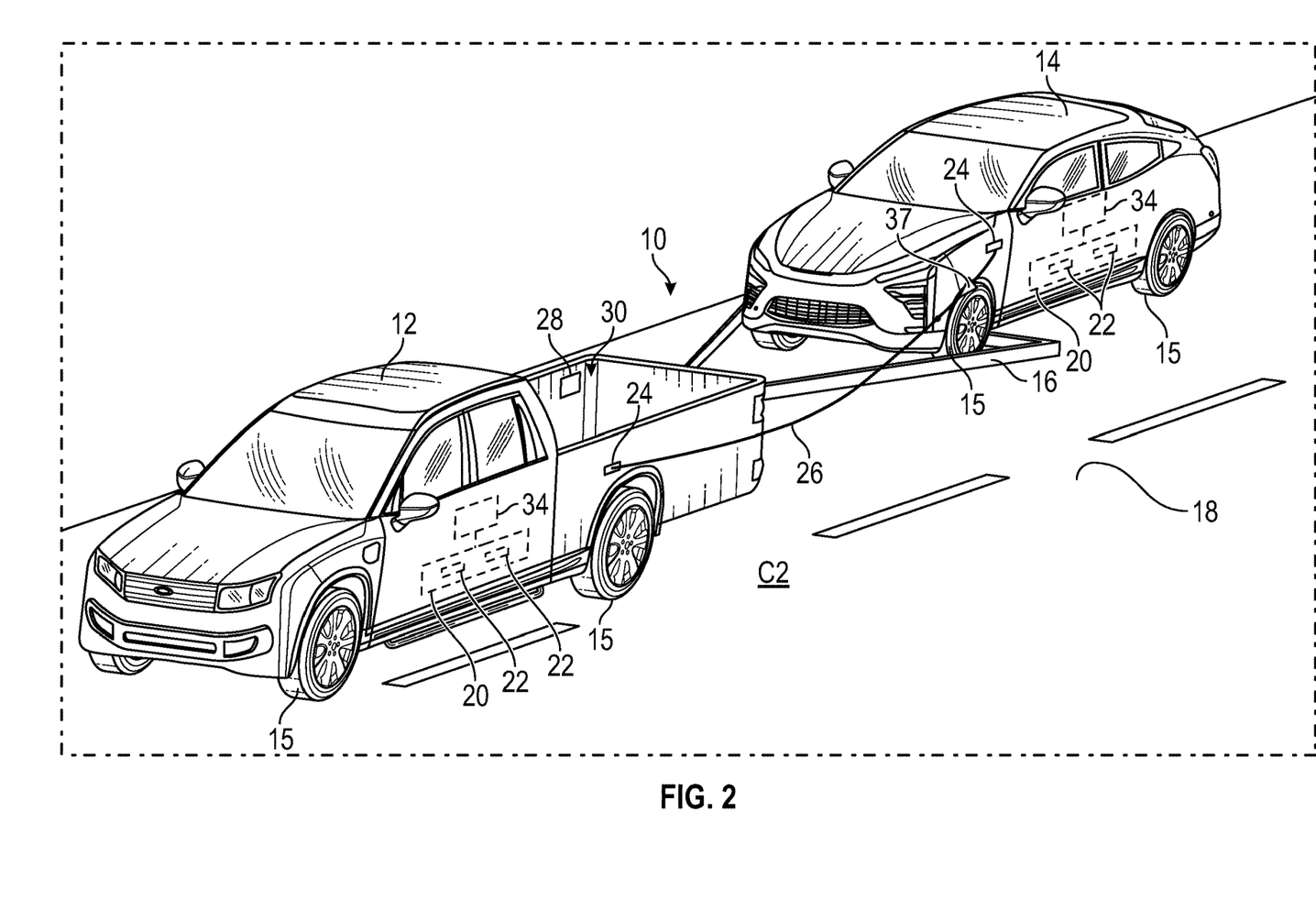
FIG. 2 schematically illustrates a second in-flight configuration of the vehicle-to-vehicle energy transfer system of FIG. 1.

FIGS. 1 and 2 schematically illustrate an exemplary vehicle-to-vehicle (V2V) in-flight energy transfer system 10 (hereinafter "the system 10") for bidirectionally transferring energy between a towing or leading vehicle 12 and a towed or trailing vehicle 14. In this disclosure, the term "in-flight" means during the coupled movement of the leading vehicle 12 and the trailing vehicle 14. Accordingly, the system 10 enables the bidirectional transfer of energy from the leading vehicle 12 to the trailing vehicle 14 or vice-versa while the leading and trailing vehicles 12, 14 are making forward progress toward their desired destinations.

The in-flight energy transfer afforded by the system 10 is beneficial to both participating parties. For example, the user/owner of the trailing vehicle 14 may take advantage of the time while being towed by resting, sleeping, eating, working, etc., and the user/owner of the leading vehicle 14 may generate income for performing the towing/charging task (i.e., revenue opportunity).

A towing device 16 may releasably couple the trailing vehicle 14 relative to the leading vehicle 12 to allow the leading vehicle 12 to pull the trailing vehicle 14 along a roadway 18 and thus control driving of the trailing vehicle 14. The towing device 16 could by any type of towing device. Accordingly, the specific configuration of the towing device 16 is not intended to limit this disclosure.

In an embodiment, the leading vehicle 12 and the trailing vehicle 14 are both plug-in type electrified vehicles (e.g., a plug-in hybrid electric vehicle (PHEV) or a battery electric vehicles (BEV)). Each of the leading and trailing vehicles 12, 14 includes a traction battery pack 20. The leading vehicle 12 and the trailing vehicle 14 may each include an electrified powertrain capable of applying a torque from an electric machine (e.g., an electric motor) for driving drive wheels 15 of the leading and trailing vehicles 12, 14. Therefore, the powertrain of each of the leading vehicle 12 and the trailing vehicle 14 may electrically propel the respective set of drive wheels 15 either with or without the assistance of an internal combustion engine.

The leading vehicle 12 of FIGS. 1-2 is schematically illustrated as a pickup truck and the trailing vehicle 14 of FIGS. 1-2 is schematically illustrated as a car. However, other vehicle configurations are also contemplated. The teachings of this disclosure may be applicable for any type of vehicle as the leading vehicle 12 and for any type of vehicle as the trailing vehicle 14. For example, the leading vehicle 12 or the trailing vehicle 14 could be configured as a car, a truck, a van, a sport utility vehicle (SUV), etc.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

Although shown schematically, each traction battery pack 20 may be configured as a high voltage traction battery pack that includes a plurality of battery arrays 22 (i.e., battery assemblies or groupings of battery cells) capable of outputting electrical power to one or more electric machines of the electrified vehicle. Other types of energy storage devices and/or output devices may also be used to electrically power each of the leading vehicle 12 and the trailing vehicle 14.

From time to time, charging the energy storage devices of the traction battery pack 20 of each of the leading vehicle 12 and the trailing vehicle 14 may be required or desirable. Each of the leading and trailing vehicles 12, 14 may therefore be equipped with a charging system that includes a charge port assembly 24. A charge cable 26 (i.e., EVSE) may be connected to the corresponding charge port assemblies 24 of the leading and trailing vehicles 12, 14 in order to transfer charge energy from the traction battery pack 20 of the leading vehicle 12 or the trailing vehicle 14 to the traction battery pack 20 of the other of the leading vehicle 12 or the trailing vehicle 14. The charge cable 26 may be configured to provide any level of charging (e.g., Level 1 AC charging, Level 2 AC charging, DC charging, etc.).

The charging system of the leading vehicle 12 could optionally be equipped with a secondary charge port assembly 28. In an embodiment, the secondary charge port assembly 28 is mounted within a cargo space 30 of the leading vehicle 12 for providing access to a power source at an external location of the leading vehicle 12. A charge cable 32 may be connected to the secondary charge port assembly 28 and the charge port assembly 24 of the trailing vehicle 14 in order to transfer charge energy from the traction battery pack 20 of one of the leading vehicle 12 or the trailing vehicle 14 to the traction battery pack 20 of the other of the leading vehicle 12 or the trailing vehicle 14. The charge cable 32 may be configured to provide Level 1 or Level 2 AC charging, for example. In another embodiment, energy can be transferred between the leading and trailing vehicles 12, 14 using both the charge cable 26 and the charge cable 32. Although not specifically shown, the leading vehicle 12 and/or the trailing vehicle 14 could be equipped with one or more additional charging interfaces.

The respective charging system of each of the leading and trailing vehicles 12, 14 may additionally include a bidirectional power transfer system 34 configured for enabling the bidirectional transfer of power between the vehicles 12, 14. The bidirectional power transfer system 34 may be operably connected between the charge port assembly 24 and the traction battery pack 20 of each of the leading vehicle 12 and the trailing vehicle 14. The bidirectional power transfer system 34 may include various equipment, such as a charger, a converter, a motor controller (which may be referred to as an inverter system controller or ISC), etc., arranged and configured to establish the bidirectional transfer of electrical energy between the respective traction battery packs 20 of the leading and trailing vehicles 12, 14. The bidirectional power transfer systems 34 may additionally be configured to transfer energy between the traction battery packs 20 and the electric motors of each respective vehicle.

One non-limiting example of a suitable bidirectional power transfer system that may be employed for use within the leading vehicle 12 and/or the trailing vehicle 14 for achieving bidirectional power transfer is disclosed within US Patent Publication No. 2020/0324665, assigned to Ford Global Technologies, LLC, the disclosure of which is herein incorporated by reference. However, other bidirectional power transfer systems could also be utilized for achieving the bidirectional transfer of power within the scope of this disclosure.

FIG. 1 schematically illustrates a first in-flight configuration C1 of the system 10. During the first in-flight configuration C1, power may be transferred from the traction battery pack 20 of the leading vehicle 12 to the traction battery pack 20 of the trailing vehicle 14 (as schematically depicted by arrow 35).

FIG. 2 schematically illustrates a second in-flight configuration C2 of the system 10. During the second in-flight configuration C2, power may be transferred from the traction battery pack 20 of the trailing vehicle 14 to the traction battery pack 20 of the leading vehicle 12 (as schematically illustrated by arrow 37). In this way, the trailing vehicle 14 may charge the leading vehicle 12 during the towing event in order to increase the towing distance that the leading vehicle 12 is capable of towing the trailing vehicle 14.

Figure 3:
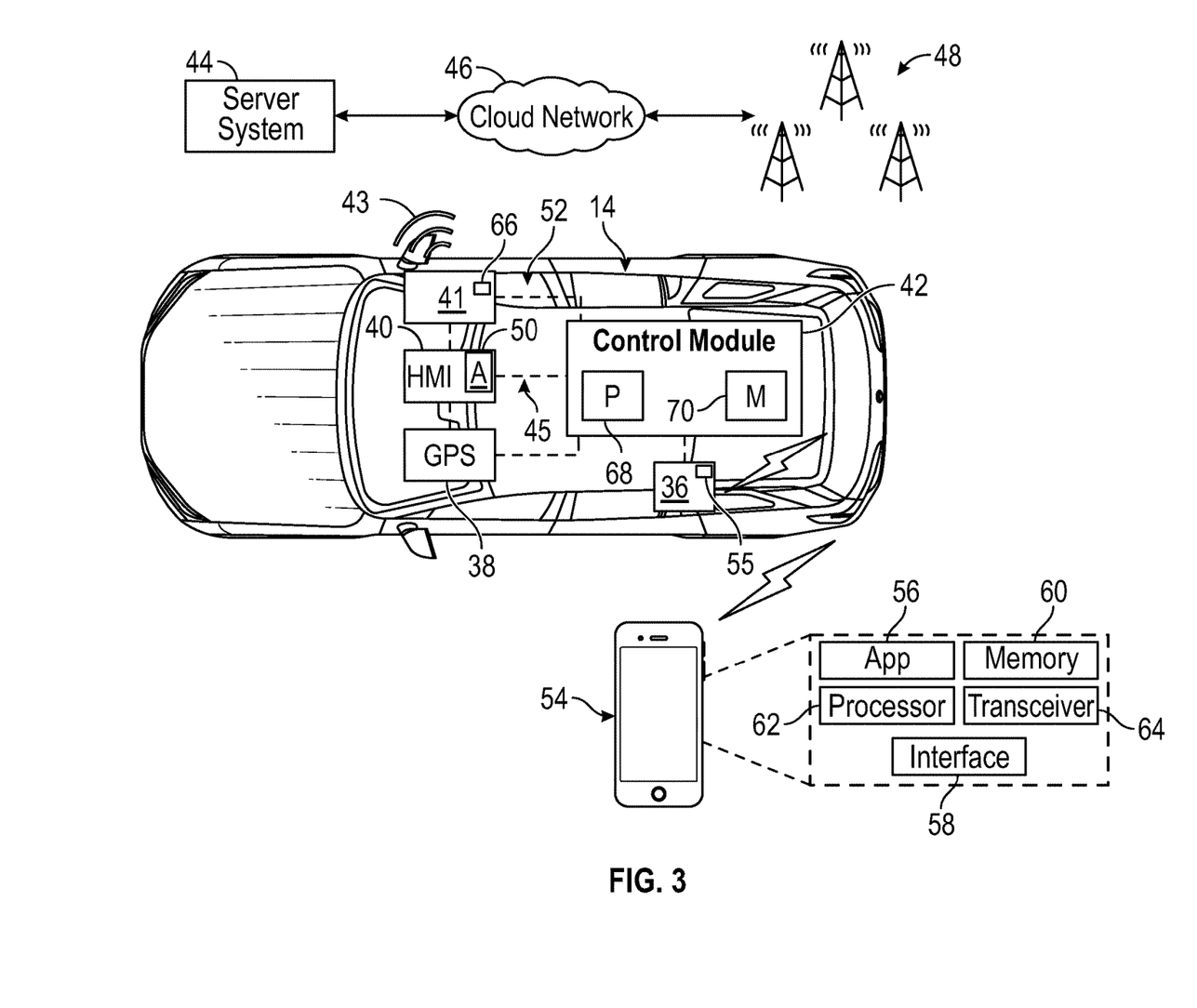
FIG. 3 schematically illustrates aspects of a vehicle-to-vehicle energy transfer system from the perspective of a trailing/towed/requesting vehicle.
Figure 4:
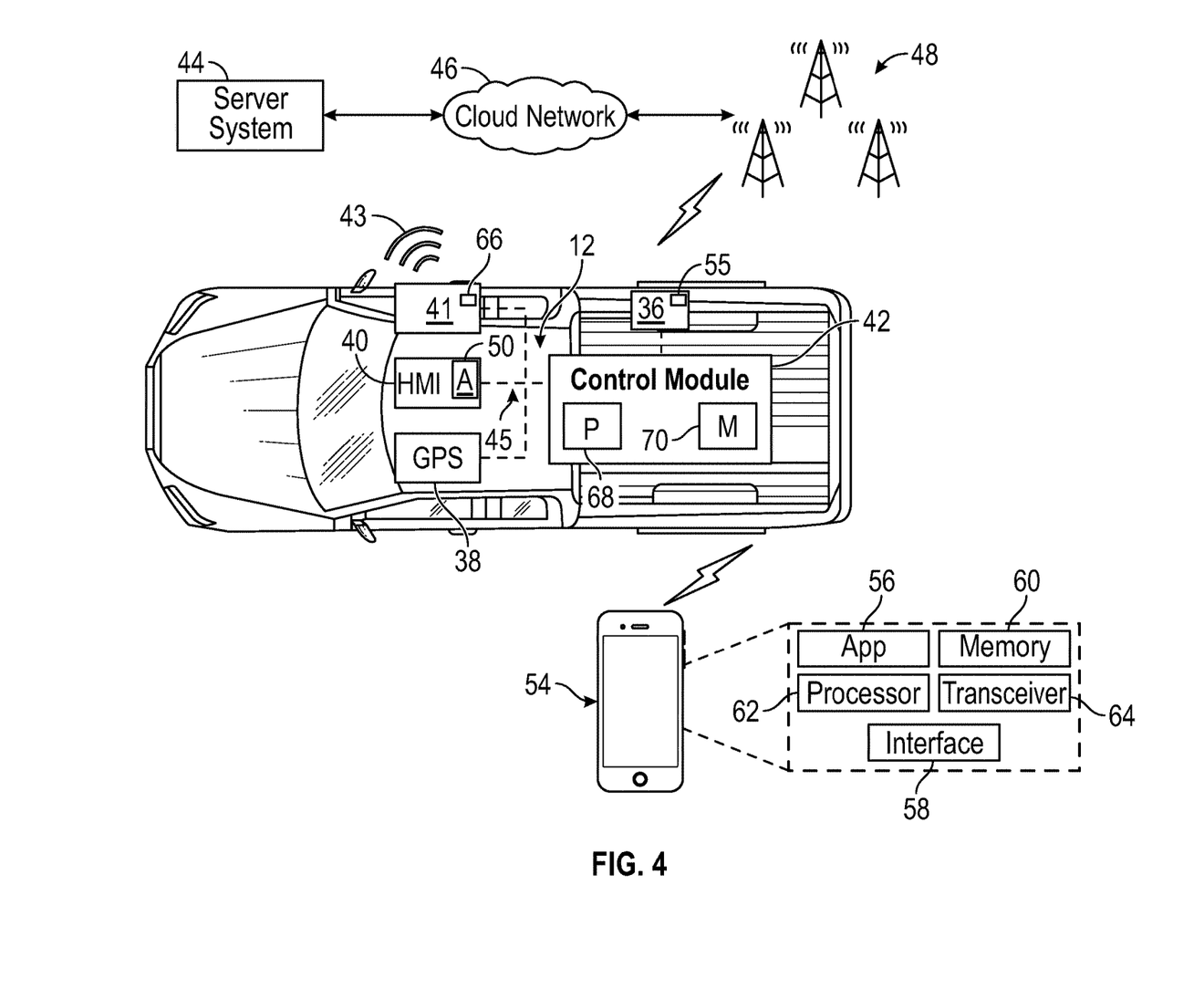
FIG. 4 schematically illustrates aspects of a vehicle-to-vehicle energy transfer system from the perspective of a leading/towing/participating vehicle.

The system 10 of FIGS. 1-2 is further detailed from the perspective of the trailing vehicle 14 in FIG. 3. The leading vehicle 12 could include similar features (see FIG. 4) as those of the trailing vehicle 14 of FIG. 3 in order to enable the system 10 to coordinate and achieve the in-flight bidirectional transfer of energy between the leading vehicle 12 and the trailing vehicle 14. Thus, where appropriate and unless incompatible, the teachings of FIG. 3 included in the following paragraphs can equally apply to the leading vehicle 12 of FIG. 4.

As schematically illustrated, the system 10 may include a telecommunications module 36, a global positioning system (GPS) 38, a human machine interface (HMI) 40, an alert system 41, and a control module 42. These components may be interconnected and in electronic communication with one another over a communication bus 45. The communication bus 45 may be a wired communication bus such as a controller area network (CAN) bus, or a wireless communication bus such as Wi-Fi, Bluetooth®, Ultra-Wide Band (UWB), etc.

The telecommunications module 36 may be configured for achieving bidirectional communication between the trailing vehicle 14 and the leading vehicle 12 over a cloud-based server system 44. The telecommunications module 36 may communicate over a cloud network 46 (i.e., the internet) to obtain various information stored on the server system 44 or to provide information to the server system 44 that can subsequently be accessed by the leading vehicle 12 (or other participating vehicles). The server system 44 can identify, collect, and store user data associated with both the leading vehicle 12 and the trailing vehicle 14 for validation purposes. Upon an authorized request, data may be subsequently transmitted to the telecommunications module 36 via one or more cellular towers 48 or via some other known communication technique (e.g., Wi-Fi, Bluetooth®, data connectivity, etc.). The telecommunications module 36 can receive data from the server system 44 or can communicate data back to the server system 44 via the cellular tower(s) 48. Although not necessarily shown or described in this highly schematic embodiment, numerous other components may enable bidirectional communication between the vehicles 12, 14 via the server system 44.

In a first embodiment, a user/owner of the trailing vehicle 14 may interface with the server system 44 using the HMI 40. For example, the HMI 40 may be equipped with an application 50 (e.g., FordPass™ or another similar application) for interfacing with the server system 44. The HMI 40 may be located within a passenger cabin 52 of the trailing vehicle 14 and may include various user interfaces for displaying information to the vehicle occupants and for allowing the vehicle occupants to enter information into the HMI 40. The vehicle occupants may interact with the user interfaces via touch screens, tactile buttons, audible speech, speech synthesis, etc.

In another embodiment, the user/owner of the trailing vehicle 14 could alternatively or additionally interface with the server system 44 for communicating with the leading vehicle 12 (or other participating vehicles) using a personal electronic device 54 (e.g., a smart phone, tablet, computer, wearable smart device, etc.). The personal electronic device 54 may include an application 56 (e.g., FordPass™ or another similar application) that includes programming to allow the user to employ one or more user interfaces 58 for setting or controlling certain aspects of the system 10. The application 56 may be stored in memory 60 of the personal electronic device 54 and may be executed by a processor 62 of the personal electronic device 54. The personal electronic device 54 may additionally include a transceiver 64 that is configured to communicate with the server system 44 over the cellular tower(s) 48 or some other wireless link.

The telecommunications module 36 may additionally include one or more wireless devices 55 that facilitate the detection of and communication with nearby vehicles, such as the leading vehicle 12. In an embodiment, the wireless device 55 is a Bluetooth® Low Energy (BLE) transceiver configured to receive and/or emit low energy signals as a way to detect and communicate with participating vehicles. However, other types of wireless devices are also contemplated within the scope of this disclosure.

The GPS 38 is configured to pinpoint an exact location of the trailing vehicle 14, such as by using satellite navigation techniques. In an embodiment, location data concerning the trailing vehicle 14 is communicated to the leading vehicle 12 (e.g., via the server system 44) for indicating the location where the leading vehicle 12 should meet the trailing vehicle 14 to begin a requested in-flight energy transfer or charging event.

The alert system 41 is configured to selectively produce and broadcast audible instructions 43 for guiding the leading vehicle 12 relative to the trailing vehicle 14, and vice versa, once the vehicles are within close proximity to one another for preparing for the in-flight charging event. For example, the alert system 41 may produce audible instructions for linking the charge cables 26 and/or 32 between the vehicles, for coupling the vehicles via the towing device 16, etc. The alert system 41 may include one or more audio actuators 66 (e.g., speakers, sound exciters, etc.) adapted for broadcasting the audible instructions 43.

The control module 42 may include both hardware and software and could be part of an overall vehicle control system, such as a vehicle system controller (VSC), or could alternatively be a stand-alone controller separate from the VSC. In an embodiment, the control module 42 is programmed with executable instructions for interfacing with and commanding operation of various components of the system 10. Although shown as separate modules within the highly schematic depiction of FIG. 3, the GPS 38, the HMI 40, and the control module 42 could be integrated together as part of common module.

The control module 42 may include a processor 68 and non-transitory memory 70 for executing various control strategies and modes associated with the system 10. The processor 68 can be a custom made or commercially available processor, a central processing unit (CPU), or generally any device for executing software instructions. The memory 70 can include any one or combination of volatile memory elements and/or nonvolatile memory elements The processor 68 may be operably coupled to the memory 70 and may be configured to execute one or more programs stored in the memory 70 of the control module 42 based on the various inputs received from other devices, such as the bidirectional power transfer system 34, the telecommunications module 36, the GPS 38, the HMI 40, etc. In an embodiment, the application 50 (e.g., FordPass™ or another similar application), which includes programming for allowing the vehicle user to employ one or more user interfaces within the HMI 40 for setting or controlling certain aspects of the system 10, may be stored in the memory 70 and may be executed by the processor 68 of the control module 42. Alternatively, the control module 42 may be configured to communicate and interface with the personal electronic device 54 for coordinating and/or executing certain aspects of the system 10.

In an embodiment, based at least on inputs from the GPS 38, the control module 42 may determine whether a distance to a nearby charging station exceeds an estimated vehicle range (e.g., a distance to empty (DTE) calculation). If so, the control module 42 may command the telecommunications module 36 to send a vehicle-to-vehicle charging request to nearby vehicles via the server system 44.

The control module 42 could alternatively command the charging request in response to a prompt made by the user at the HMI 40. For example, the user could manually request in flight-charging when they wish to sleep, rest, work, etc. during the in-flight charging event.

In another embodiment, based on inputs from the GPS 38 and the HMI 40, the control module 42 may communicate with and verify the location and identify of the leading vehicle 12 as it approaches (e.g., within 50 meters) the trailing vehicle 14 for initiating an in-flight charging event. Encrypted signals (e.g., encrypted Bluetooth® Low Energy (BLE) signals) may be communicated for verifying the relative vehicles positions.

In another embodiment, the control module 42 may command activation of a hazard lamp of the trailing vehicle 14 when it is determined that the leading vehicle 12 is within a predefined distance of the trailing vehicle 14. The control module 42 may further verify the identify of the leading vehicle 12, such as via a unique code/pin that may be exchanged between the respective vehicles through the application 50 or the application 56 or via the wireless device 55.

In another embodiment, the control module 42 may command the alert system 41 to broadcast the audible instructions for guiding the leading vehicle 12 relative to the trailing vehicle 14 once the vehicles are within the predefined distance of one another, for linking charging cables, securing the trailing vehicle 14 to the towing device 16, etc.

In yet another embodiment, the control module 42 may command disablement of various chassis controls (steering, braking, accelerator, etc.) of the trailing vehicle 14 in response to connecting the trailing vehicle 14 to the towing device 16. The chassis controls can subsequently be enabled by the control module 42 in response to receiving a user prompt at the HMI 40.

In yet another embodiment, the control module 42 may interface with and control the functionality of the bidirectional power transfer system 34 for commanding either the first in-flight configuration C1 or the second in-flight configuration C2 at any given point during the in-flight charging event. The control module 42 may also control the wireless device 55 of the telecommunications module 36 for coordinating the desired power transfer with the participating vehicle (e.g., the leading vehicle 12) during the in-flight charging event.

FIGS. 5-11, with continued reference to FIGS. 1-4, schematically illustrate an exemplary use case for coordinating and executing an in-flight charging event between the leading vehicle 12 and the trailing vehicle 14 via the system 10. The exemplary use case assumes that available charging stations are located further than an available vehicle range of the trailing vehicle 14 due to current state of charge levels of the traction battery pack 20 and that the user of the trailing vehicle 14 has manually approved of engaging in the in-flight charging event. However, other use cases are further contemplated within the scope of this disclosure, such as, for example, situations in which the trailing vehicle 14 has an adequate amount of battery charge but still desires to enter into an in-flight charging event to have their energy levels topped off for a period of time while they sleep, rest, work, eat, etc. during their trip.

Figure 5:
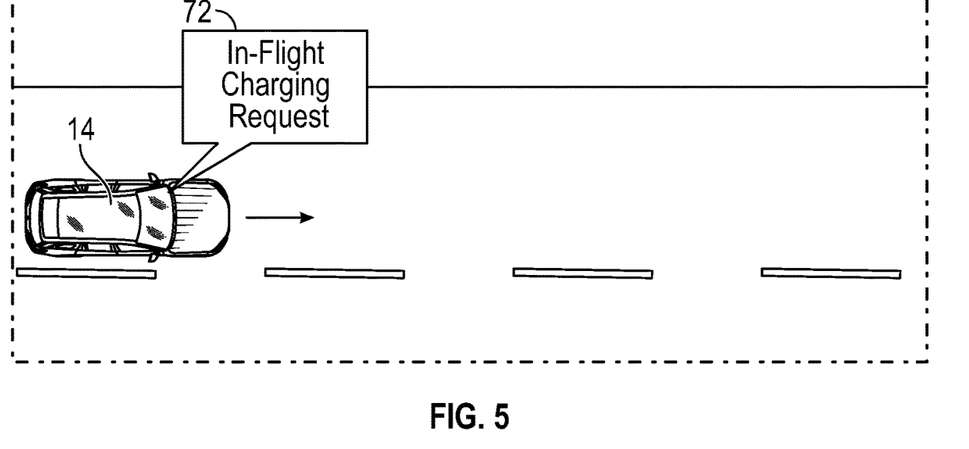
FIGS. 5, 6, 7, 8, 9, 10, and 11 schematically illustrate an exemplary use case for coordinating and executing an in-flight charging event between a leading vehicle and a trailing vehicle.

Referring first to FIG. 5, via the HMI 40 and/or the personal electronic device 54, the user/owner of the trailing vehicle 14 may transmit an in-flight charging request 72 to nearby vehicles, which in this example includes the leading vehicle 12. In this scenario, the trailing vehicle 14 may therefore be referred to as the requesting vehicle. The in-flight charging request 72 may specify a multitude of information related to coordinating a subsequent in-flight charging event, including but not limited to, the type of charging desired (e.g., DC charging only), a charge transfer availability of a predefined distance/amount of time of the participating vehicle, a towing capacity/distance of the participating vehicle, the requesting vehicle's weight, a max tow speed, penalties for violating traffic laws (red lights, speed limits, route deviations), etc.

Figure 6:
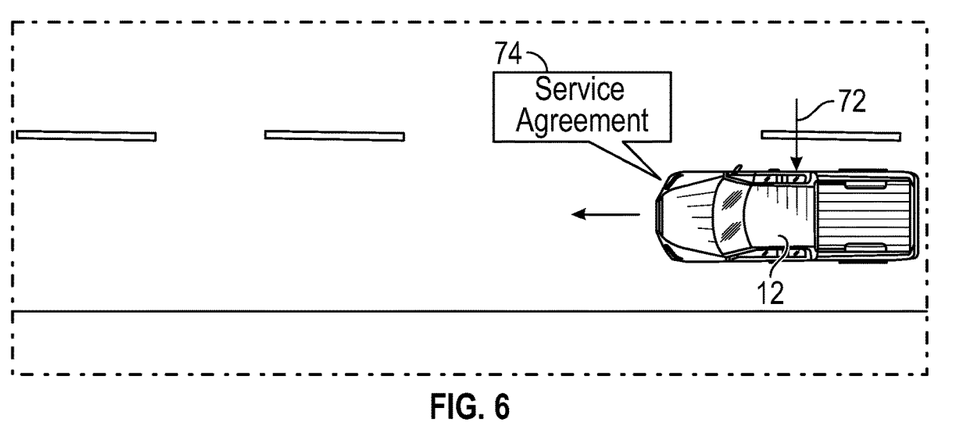

Referring to FIG. 6, an eligible nearby vehicle such as the leading vehicle 12 may receive the in-flight charging request 72 from the trailing vehicle 14. In this scenario, the leading vehicle 12 may therefore be referred to as the participating vehicle. The in-flight charging request 72 may be compared to the capabilities of leading vehicle 12 in order to determine its ability to meet the demands contained within the in-flight charging request 72 of the trailing vehicle 14. The relevant capabilities of the leading vehicle 12 may include, but are not limited to, the amount of available traction battery pack state of charge (SOC) to transfer, expected remaining SOC after transfer, towing distance/capability, destination (i.e., is the expected route of the leading vehicle 12 the same as that of the trailing vehicle 14?), charge type capability (e.g. AC charging, DC charging, etc.), time commitment involved with the requested in-flight charging event, etc.

Assuming the leading vehicle 12 is capable of and willing to meet the demands of the in-flight charging request 72, the owner/user of the leading vehicle 12 may then transmit a service agreement 74 back to the trailing vehicle 14. The service agreement 74 may specify the specific terms and conditions that will be involved with performing the in-flight charging event. The specified terms and conditions of the service agreement 74 may include, but are not limited to, the price for performing the service, the expected duration of the service (i.e., in time, distance, etc.), a listing of any extra services, whether or not the trailing vehicle 14 will provide energy to the leading vehicle 12 in exchange for towing capacity during the service, etc. The service agreement 74 may additionally include one or more items that are up for negotiation.

Figure 7:
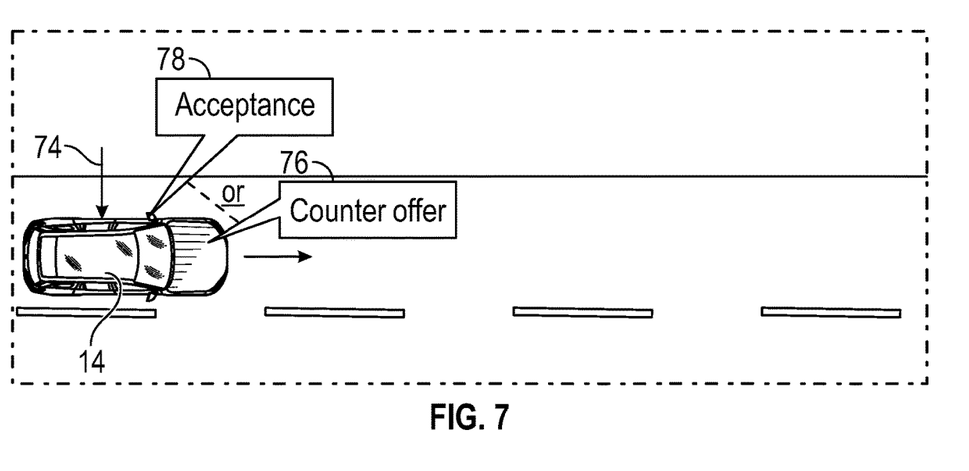

Referring to FIG. 7, the trailing vehicle 14 may receive the service agreement 74 from the leading vehicle 12. The service agreement 74 may be reviewed by the owner/user of the trailing vehicle 14 and may either be countered with a counteroffer 76 or accepted with an acceptance 78. The counteroffer 76 may include an adjustment to one or more terms/conditions of the service agreement 74. Either the counteroffer 76 or the acceptance 78 may specify terms for providing energy from the trailing vehicle 14 to the leading vehicle 12 in exchange for towing capacity during the service. This type of back-and-forth negotiation between the engaged parties may continue until the user of the leading vehicle 12 and the user of the trailing vehicle 14 agree to the specific terms and conditions that will control the in-flight charging event. The trailing vehicle 14 may share its location with the leading vehicle 12 after the specific terms and conditions that will control the in-flight charging event have been agreed upon.

Figure 8:
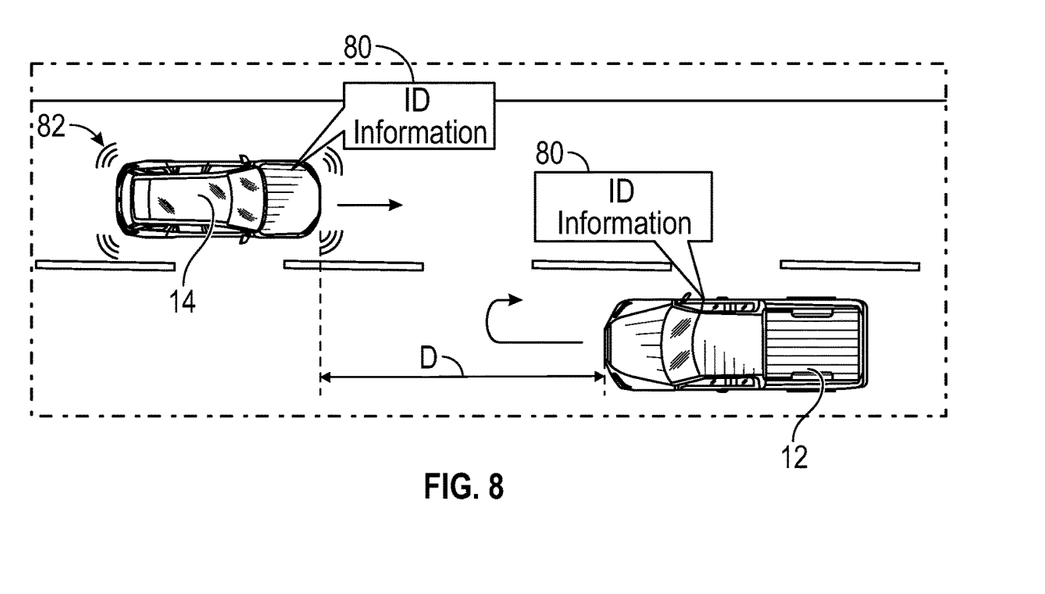

Referring to FIG. 8, the leading vehicle 12 may next begin traveling toward the trailing vehicle 14. Once the vehicles are within a predefined distance D of one another, identification information 80 may be exchanged between the vehicles (e.g., via the wireless devices 55) for identification purposes. The identification information 80 may include identification details (e.g., pictures of the vehicles and the users/owners of the vehicles, etc.). The identification information 80 may additionally include a unique code/pin that may be exchanged between the respective vehicles for ensuring the correct vehicles are engaging one another. Hazard lights 82 of the trailing vehicle 14 may be activated once the leading vehicle 12 is within the predefined distance D relative to the trailing vehicle 14.

Figure 9:
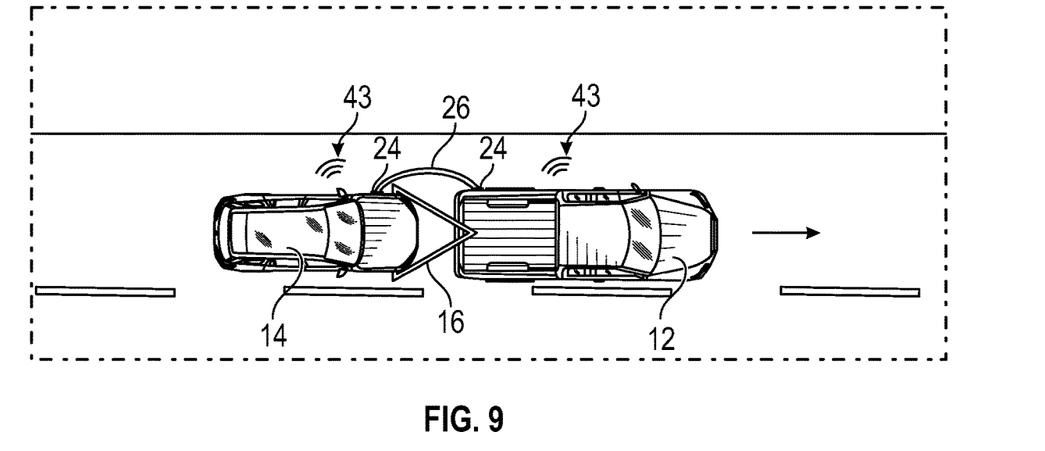

Referring to FIG. 9, the alert system 41 associated with each vehicle may be commanded to broadcast audible instructions 43 once the leading vehicle 12 reaches the location of the trailing vehicle 14. The trailing vehicle 14 may then be coupled to the leading vehicle 12 via the towing device 16 and the charging cable 26 may be connected to the charge port assembly 24 of each respective vehicle. The leading vehicle 12 may then begin towing the trailing vehicle 14 as part of an in-flight charging event. Depending on what was negotiated between the respective parties, the first in-flight configuration C1, the second in-flight configuration C2, or both may be executed during the in-flight charging event. Therefore, power may be transferred from the leading vehicle 12 to the trailing vehicle 14, from the trailing vehicle 14 to the leading vehicle 12, or both during the in-flight charging event.

Figure 10:
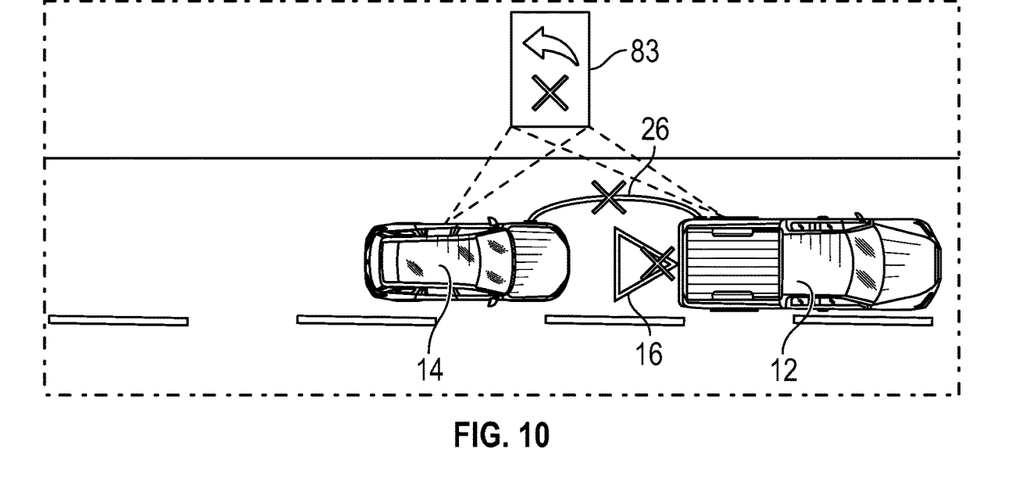

Referring to FIG. 10, either the leading vehicle 12 or the trailing vehicle 14 may terminate the in-flight charging event at any time, such as by inputting a termination request 83 using either the HMI 40 or the personal electronic device 54. In response to the termination request 83, the control module 42 of each vehicle may immediately command the bidirectional power transfer system 34 to halt the power transfer. The towing device 16 and the charging cable 26 may then be disconnected from the leading and trailing vehicles 12, 14. If either party violates the terms/conditions of the agreed-upon service agreement, then the violating vehicle can be billed in their account.

Figure 11:
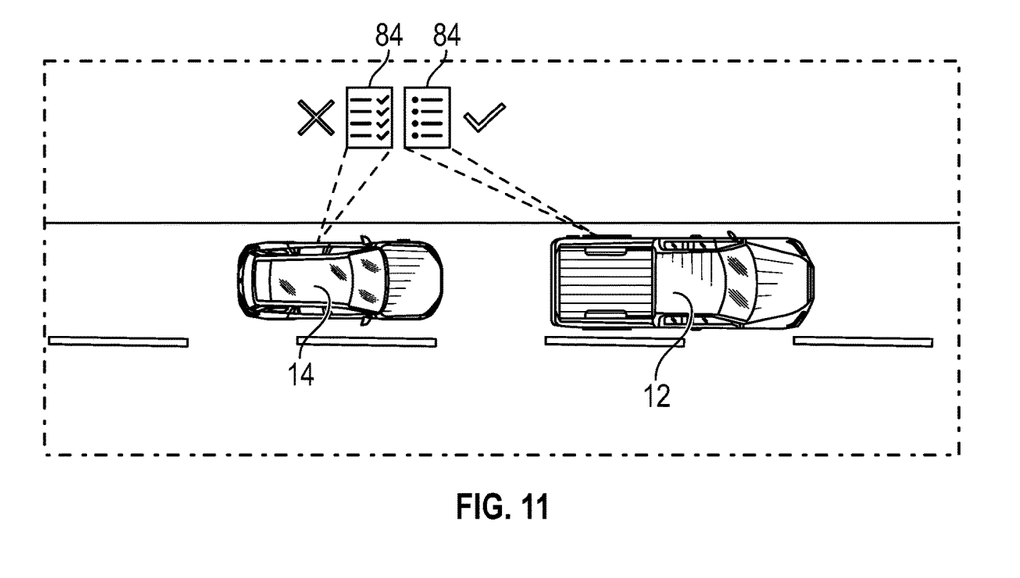

Referring to FIG. 11, upon the conclusion of the service, the owner/user of the leading vehicle 12 and/or the owner/user of the trailing vehicle 14 may provide an experience rating 84 pertaining to the in-flight charging event. The experience rating 84 may be entered using the HMI 40 or the personal electronic device 56 and may be published for review by future energy transfer participants.

Figure 12:
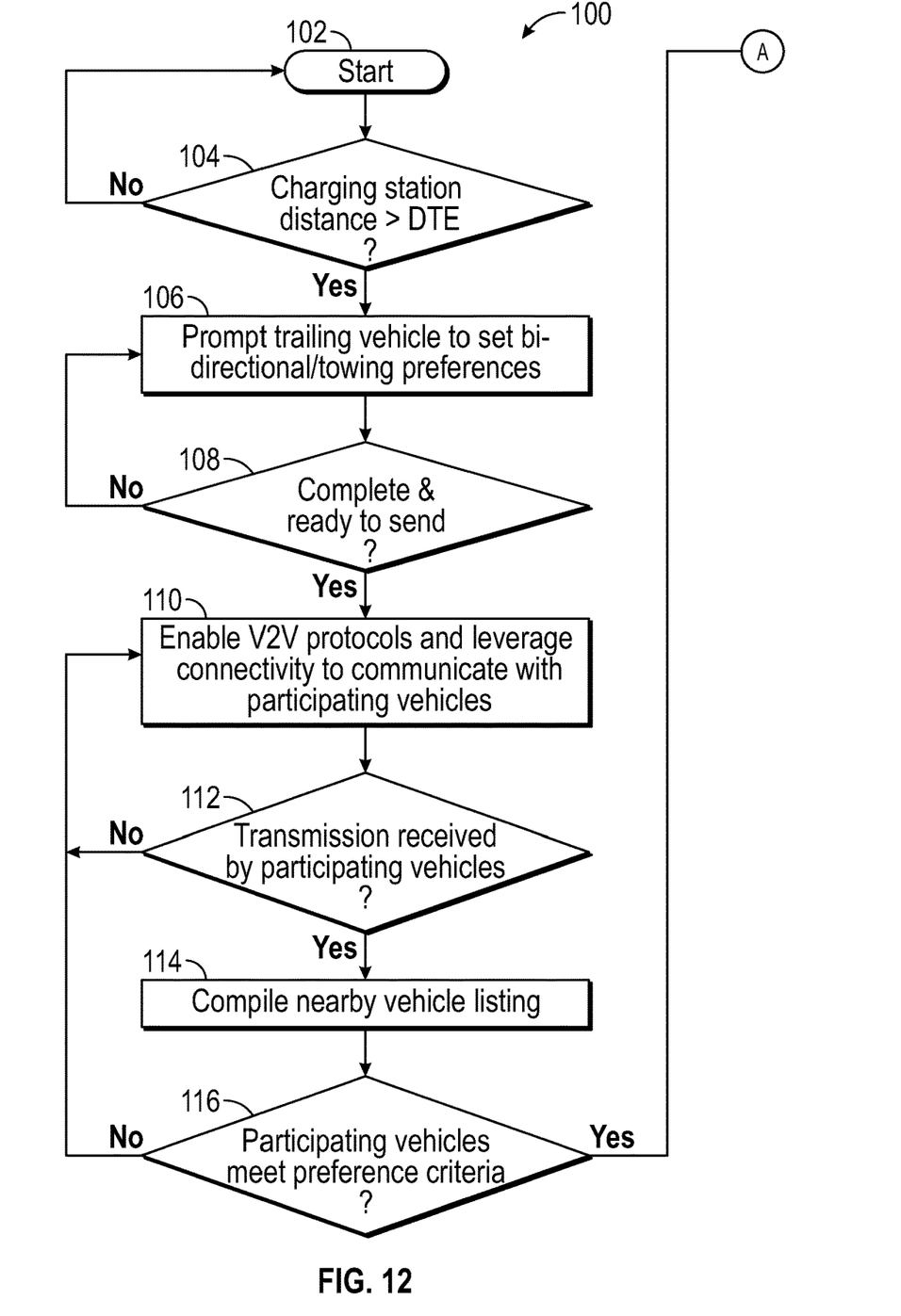
FIG. 12 illustrates a flow chart of an exemplary method for coordinating and executing an in-flight charging event.

FIG. 12, with continued reference to FIGS. 1-11, schematically illustrates in flow chart form an exemplary method 100 for coordinating and executing an in-flight charging event, such as between the leading vehicle 12 and the trailing vehicle 14. The system 10 may be configured to employ one or more algorithms adapted to execute at least a portion of the steps of the exemplary method 100. For example, the method 100 may be stored as executable instructions in the memory 70 of each control module 42, and the executable instructions may be embodied within any computer readable medium that can be executed by the processor 68 of the control module 42.

The exemplary method 100 may begin at block 102. At block 104, the method 100 may determine whether a distance to a closest nearby charging station is greater than a DTE estimation of the trailing vehicle 14. If YES, the method 100 may proceed to block 106 by prompting the user of the trailing vehicle 14 to set his/her bidirectional/towing preferences. The prompt can be provided on the HMI 40 and/or the personal electronic device 54.

The method 100 may determine whether the bidirectional/towing preferences are ready to send at block 108, and if so, the vehicle-to-vehicle protocols of the trailing vehicle 14 may be enabled and leveraged for communicating the in-flight charging request 72 from the trailing vehicle 14 to nearby vehicles at block 110.

The method 100 may determine whether the in-flight charging request 72 has been received by any nearby vehicles at block 112. A listing of nearby vehicles may be compiled at block 114 for display to the user of the trailing vehicle 14.

The method 100 may determine whether any nearby vehicles can meet the in-flight charging request 72 at block 116. If YES, the participating vehicle (i.e., the leading vehicle 12) may review the preferences contained within the in-flight charging request 72 at block 118.

At block 120, the user of the leading vehicle 12 may prepare the service agreement 74. At block 122, the vehicle-to-vehicle protocols of the leading vehicle 12 may be enabled and leveraged for communicating the service agreement 74 from the leading vehicle 12 to the trailing vehicle 14.

The method 100 may determine whether the service agreement 74 has been received by the trailing vehicle 14 at block 124. If YES, the trailing vehicle 14 may review the service agreement 74 at block 126.

The user of the trailing vehicle 14 may either accept or reject the terms/conditions of the service agreement at block 128. If rejected, the user of the trailing vehicle 14 may transmit the rejection with or without the option for renegotiation to the leading vehicle 12 at block 130.

Alternatively, if the service agreement 74 is accepted, the method 100 may proceed to block 132. At block 132, the location of the leading and trailing vehicles 12, 14 may be shared with one another (e.g., via GPS, sensors, BLE triangulation, etc.).

Next, at block 134, the method 100 may exchange customer identification details (e.g., pictures of the vehicles themselves, pictures of the users/owners of the vehicles, etc.) between the leading and trailing vehicles 12, 14 for confirming vehicle identifies. The method 100 may further generate and exchanger unique codes/pins between the vehicles at block 136. The codes/pins can be utilized by the users of the leading and trailing vehicles to confirm the correct vehicle match.

Proceeding now to block 138, the method 100 may determine whether the leading and trailing vehicles 12, 14 are within a predefined distance (e.g., approximately 50 meters) of one another. If YES, the method 100 may activate the hazard lights 82 of the trailing vehicle 14 at block 140 for visual identification.

The unique codes/pins exchanged at block 136 may be compared for a match at block 142. If the codes/pins match at block 144, the method 100 may activate the alert systems 41 of the leading and trailing vehicles 12, 14 at block 146 for providing audible instructions related to initiating the in-flight charging event.

The method 100 may confirm all necessary connections (charge cables, towing device, etc.) have been made at block 148. If YES, the leading vehicle 12 may begin towing the trailing vehicle 14 and the in-flight charging may be initiated at block 150.

The method 100 may confirm whether the charging event has concluded at block 152. If YES, both the user of the leading vehicle 12 and the user of the trailing vehicle 14 may be given the opportunity to provide an experience rating for the in-flight charging event at block 154. The method 100 may end at block 156.

The vehicle-to-vehicle (V2V) in-flight energy transfer systems of this disclosure are designed to provide bidirectional charging while the participating vehicles are making forward progress toward their respective destinations. The in-flight bidirectional energy transfer afforded by the proposed systems is beneficial to both participating parties. For example, the user/owner of the trailing vehicle may take advantage of the time while being towed by resting, sleeping, eating, working, etc., and the user/owner of the leading vehicle may generate income for performing the towing/charging task. The proposed systems may further promote goodwill and comradery between the vehicle owners.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle-to-vehicle in-flight energy transfer system, comprising:
 a leading vehicle;
 a trailing vehicle; and
 a control module configured to:
  determine whether a distance from the trailing vehicle to a charging station exceeds an estimated vehicle range of the trailing vehicle;
  command transmission of an in-flight charging request from the trailing vehicle to the leading vehicle when the distance exceeds the estimated vehicle range;
  control a transfer of energy from the leading vehicle to the trailing vehicle during a first portion of an in-flight energy transfer event; and
  control a transfer of energy from the trailing vehicle to the leading vehicle in a manner that extends an available towing distance of the leading vehicle during a second portion of the in-flight energy transfer event.

2. The system as recited in claim 1, wherein the trailing vehicle is coupled to the leading vehicle by a towing device during the in-flight energy transfer event.

3. The system as recited in claim 1, comprising a charge cable that connects to a first charge port assembly of the leading vehicle and a second charge port assembly of the trailing vehicle during the in-flight energy transfer event.

4. The system as recited in claim 1, wherein the control module is configured to interface with a bidirectional power transfer system of at least one of the leading vehicle and the trailing vehicle for controlling the transfer of energy from the trailing vehicle to the leading vehicle.

5. The system as recited in claim 1, wherein the transfer of energy is initiated in response to an input from a user of the leading vehicle or the trailing vehicle, wherein the input is received at a human machine interface or a personal electronic device associated with the leading vehicle or the trailing vehicle.

6. The system as recited in claim 1, wherein the control module is further configured to coordinate, through a cloud-based server system, terms and conditions of a service agreement for executing the in-flight charging event between the leading vehicle and the trailing vehicle.

7. The system as recited in claim 1, wherein the control module is further configured to command an alert system of the leading vehicle or the trailing vehicle to emit audible instructions for guiding the leading vehicle or the trailing vehicle relative to the other of the leading vehicle or the trailing vehicle prior to performing the in-flight energy transfer event.

8. The system as recited in claim 1, wherein the control module is further configured to:
receive a termination request from either the leading vehicle or the trailing vehicle; and
in response to the termination request, command a bidirectional power transfer system to halt the transfer of energy.

9. The system as recited in claim 1, comprising a human machine interface or a personal electronic device associated with the leading vehicle or the trailing vehicle, wherein the human machine interface, the personal electronic device, or both is configured through a cloud-based application to receive an input of an experience rating associated with the in-flight charging event.

10. A method, comprising:
determining whether a distance from a trailing vehicle to a charging station exceeds an estimated vehicle range of the trailing vehicle;
transmitting an in-flight charging request from the trailing vehicle to a leading vehicle when the distance exceeds the estimated vehicle range;
during a first portion of an in-flight energy transfer event, transferring energy from the leading vehicle to the trailing vehicle; and
during a second portion of the in-flight energy transfer event, transferring energy from the trailing vehicle to the leading vehicle to extend an available towing distance of the leading vehicle.

11. The method as recited in claim 10, comprising, during the in-flight energy transfer event:
transferring energy from the leading vehicle to the trailing vehicle.

12. The method as recited in claim 10, comprising, prior to transferring the energy:
comparing a capability of the leading vehicle to one or more preferences contained within the in-flight charging request;
preparing a service agreement of terms and conditions that will control the in-flight energy transfer event;
transmitting the service agreement to the trailing vehicle; and
either accepting the terms and conditions of the service agreement or transmitting a counteroffer to the leading vehicle.

13. The method as recited in claim 10, comprising:
upon completion of the in-flight energy transfer event, publishing a service experience rating from a user of the leading vehicle, a user of the trailing vehicle, or both.

14. The method as recited in claim 10, comprising, prior to transferring the energy:
verifying an identify of the leading vehicle or the trailing vehicle via a unique code or pin that is exchanged between the respective vehicles.

15. The method as recited in claim 10, comprising:
receiving a termination request from either the leading vehicle or the trailing vehicle; and
in response to the termination request, commanding a bidirectional power transfer system to halt the transferring of the energy.

16. A vehicle-to-vehicle in-flight energy transfer system, comprising:
a memory; and
a processor operably coupled to the memory and configured to:
determine when a distance from a first vehicle to a charging station exceeds an estimated vehicle range of the first vehicle;
coordinate terms and conditions of a service agreement between the first vehicle and a second vehicle for performing an in-flight charging event when the distance exceeds the estimated vehicle range;
coordinate a transfer of energy between the first vehicle and the second vehicle during the in-flight charging event for controlling the transfer of energy from the first vehicle to the second vehicle during a first portion of the in-flight charging event and the transfer of energy from the second vehicle to the first vehicle in a manner that extends an available towing distance of the first vehicle during a second portion of the in-flight charging event; and
coordinate a publication of a service experience rating from a user of the first vehicle, a user of the second vehicle, or both upon completion of the in-flight charging event.

17. The system as recited in claim 1, wherein the control module is further configured to command an activation of a hazard lamp of the trailing vehicle when the leading vehicle is within a predefined distance of the trailing vehicle prior to performing the in-flight energy transfer event.

18. The system as recited in claim 2, wherein the control module is further configured to command a disablement of a chassis control of the trailing vehicle in response to connecting the trailing vehicle to the towing device.

19. The system as recited in claim 7, wherein the alert system includes a sound exciter adapted for broadcasting the audible instructions.

20. The method as recited in claim 10, comprising, prior to initiating the in-flight energy transfer event, disabling a chassis control of the trailing vehicle.

* * * * *